United States Patent
Dickmann et al.

(10) Patent No.: US 11,930,324 B2
(45) Date of Patent: Mar. 12, 2024

(54) SYSTEMS AND METHODS FOR PERFORMING AN AUTHENTICATED PAIRING PROCEDURE FOR A COMMUNICATION CHANNEL BETWEEN A HEARING DEVICE AND A CHARGING DEVICE

(71) Applicant: SONOVA AG, Staefa (CH)

(72) Inventors: Georg Dickmann, Ebmatingen (CH); Alexander Maksyagin, Ebmatingen (CH); Michael von Tessin, Esslingen (CH); Andreas Breitenmoser, Zurich (CH)

(73) Assignee: Sonova AG, Staefa (CH)

( * ) Notice: Subject to any disclaimer, the term of this patent is extended or adjusted under 35 U.S.C. 154(b) by 203 days.

(21) Appl. No.: 17/217,352

(22) Filed: Mar. 30, 2021

(65) Prior Publication Data

US 2022/0322016 A1    Oct. 6, 2022

(51) Int. Cl.
| | |
|---|---|
| H04R 25/00 | (2006.01) |
| H04L 9/40 | (2022.01) |
| H04W 12/06 | (2021.01) |
| H04W 12/50 | (2021.01) |
| H04W 76/10 | (2018.01) |

(52) U.S. Cl.
CPC ........... *H04R 25/554* (2013.01); *H04L 63/18* (2013.01); *H04R 25/558* (2013.01); *H04W 12/06* (2013.01); *H04W 12/50* (2021.01); *H04W 76/10* (2018.02); *H04R 2225/31* (2013.01); *H04R 2225/55* (2013.01)

(58) Field of Classification Search
CPC . H04L 63/18; H04R 2225/31; H04R 2225/55; H04R 25/554; H04R 25/558; H04W 12/06; H04W 12/50; H04W 76/10
USPC .......................................................... 381/315
See application file for complete search history.

(56) References Cited

U.S. PATENT DOCUMENTS

| | | |
|---|---|---|
| 7,620,195 B2 | 11/2009 | Bengtsson et al. |
| 7,747,030 B2 | 6/2010 | Fink et al. |
| 7,974,427 B2 | 7/2011 | Fink et al. |
| 8,265,315 B2 | 9/2012 | Sorensen et al. |
| 8,344,689 B2 | 1/2013 | Boguslavskij |
| 8,538,050 B2 | 9/2013 | Fink et al. |
| 9,014,407 B2 | 4/2015 | Boguslavskij et al. |
| 9,769,558 B2 | 9/2017 | Chandramohan et al. |
| 9,967,649 B2 | 5/2018 | Chandramohan et al. |

(Continued)

FOREIGN PATENT DOCUMENTS

| | | |
|---|---|---|
| DE | 102012218663 | 4/2014 |
| EP | 0909113 | 4/1999 |
| EP | 1727395 | 8/2008 |

*Primary Examiner* — Phylesha Dabney
(74) *Attorney, Agent, or Firm* — ALG Intellectual Property, LLC

(57) ABSTRACT

An illustrative system includes a hearing device and a charging device configured to provide a power signal to the hearing device while the hearing device is within a charging range of the charging device. The hearing device and the charging device are configured to establish a primary communication channel between the hearing device and the charging device and participate in an authenticated pairing procedure for the primary communication channel in which authentication information is transmitted from one device to the other by way of a secondary communication channel that allows for communication only over distances that are below a threshold distance.

16 Claims, 10 Drawing Sheets

(56) References Cited

U.S. PATENT DOCUMENTS

| | | | |
|---|---|---|---|
| 10,306,381 | B2 | 5/2019 | Sandhu et al. |
| 2006/0039577 | A1 | 2/2006 | Sanguino et al. |
| 2006/0256989 | A1 | 11/2006 | Olsen et al. |
| 2007/0195979 | A1 | 8/2007 | Thomasson et al. |
| 2012/0189146 | A1 | 7/2012 | Wuidart |
| 2012/0190305 | A1 | 7/2012 | Wuidart |
| 2013/0016861 | A1 | 1/2013 | Kaempf |
| 2017/0013369 | A1 | 1/2017 | Renken et al. |
| 2019/0184842 | A1 | 6/2019 | Waters |
| 2019/0190291 | A1 | 6/2019 | Waters |
| 2019/0268680 | A1 | 8/2019 | Solum et al. |
| 2019/0268703 | A1 | 8/2019 | Solum et al. |
| 2019/0268705 | A1 | 8/2019 | Solum et al. |
| 2019/0268706 | A1 | 8/2019 | Solum et al. |
| 2019/0268707 | A1 | 8/2019 | Solum et al. |
| 2019/0306637 | A1 | 10/2019 | Aazami et al. |
| 2020/0359124 | A1 | 11/2020 | Hankey et al. |

SYSTEMS AND METHODS FOR PERFORMING AN AUTHENTICATED PAIRING PROCEDURE FOR A COMMUNICATION CHANNEL BETWEEN A HEARING DEVICE AND A CHARGING DEVICE

BACKGROUND INFORMATION

A conventional charging device configured to be used with a hearing device (e.g., a hearing aid configured to provide improved hearing capability to a user) is configured to charge the hearing device while the hearing device is in physical contact with the charging device. For example, a charging device may be configured to sense that a hearing device has been placed into the charging device and, in response, begin providing a power signal to the hearing device.

In some scenarios, it may be desirable for a charging device to provide additional functionality for the hearing device. For example, it may be desirable for a charging device to provide user interface functionality for a hearing device, as the hearing device may be relatively small and lack its own user interface functionality.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
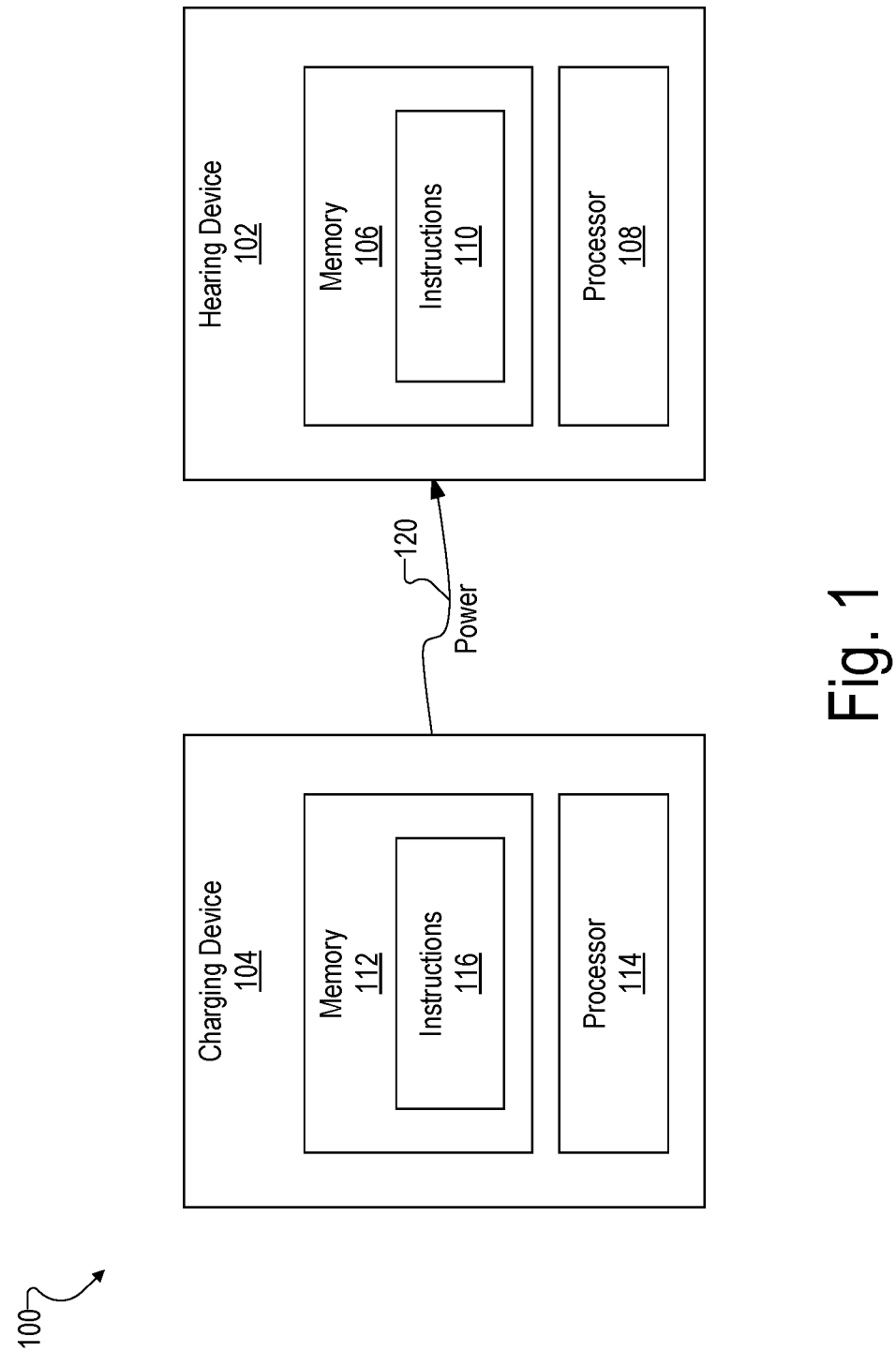
FIG. 1 shows an illustrative system in which a hearing device receives power from a charging device.

Systems and methods for performing an authenticated pairing procedure for a communication channel between a hearing device and a charging device are described herein. To illustrate, when the hearing device is within a charging range of the charging device, the hearing device and the charging device may be configured to establish a primary communication channel (e.g., a Bluetooth wireless communication channel or a wireless network communication channel) therebetween and participate in an authenticated pairing procedure for the primary communication channel. For example, the charging device may transmit authentication information to the hearing device by way of a secondary communication channel that allows for communication only over distances that are below a threshold distance. The hearing device may then use the authentication information to complete the authenticated pairing procedure. Alternatively, the hearing device may transmit the authentication information to the charging device by way of the secondary communication channel, and the charging device may then use the authentication information to complete the authenticated pairing procedure.

In either configuration, by using a secondary communication channel that allows for communication only over distances that are below a threshold distance to transmit the authentication information from one device to the other, the systems and methods described herein may minimize or eliminate the risk of a bad actor (e.g., a man-in-the-middle attack) intercepting or modifying the authentication information and thereby gaining access to data transmitted by way of the primary communication channel. This may allow the charging device to be securely used to issue requests toward the hearing device, perform security-relevant operations (e.g., by initiating a discoverable mode or a pairing mode of the hearing device), and/or retrieve sensitive information about the internal state of the hearing device and/or about the user of the hearing device.

Moreover, the systems and methods described herein may establish trust between a charging device and a hearing device without any user interaction or pre-association by the manufacturer. Because placing a hearing device within a charging range of a charging device (e.g., by inserting the hearing device into the charging device) is an intentional gesture of the user, trust into the charging device can be extrapolated from that gesture.

Furthermore, the systems and methods described herein may allow a user to use any charging device he or she trusts to perform security relevant functionality.

Compared to previous solutions that use a single communication channel (e.g., modulation of the charging device voltage or the inductive charging field only) between charging device and hearing devices, the systems and methods described herein allow for the deployment of a high-throughput, bidirectional, and low-latency primary communication channel while benefiting from the same level of security as is typically provided by short distance communication only.

These and other benefits of the present systems and methods are described in more detail herein.

FIG. 1 shows an illustrative system 100 in which a hearing device 102 receives a power signal 120 from a charging device 104. Power signal 120 may be a voltage signal, an inductively transmitted power signal, and/or any other signal configured to charge a power supply (e.g., battery) of hearing device 102).

Hearing device 102 may be implemented by any type of hearing device configured to provide or enhance hearing to a user of hearing device 102. For example, hearing device 102 may be implemented by a hearing aid configured to apply amplified audio content to a user, a sound processor included in a cochlear implant system configured to apply electrical stimulation representative of audio content to a user, a sound processor included in an electro-acoustic stimulation system configured to apply electro-acoustic stimulation to a user, a head-worn headset, an ear-worn ear-bud, or any other suitable hearing prosthesis.

As shown, hearing device 102 may include, without limitation, a memory 106 and a processor 108 selectively and communicatively coupled to one another.

In some embodiments, memory 106 may be implemented by any suitable non-transitory computer-readable medium and/or non-transitory processor-readable medium, such as any combination of non-volatile storage media and/or volatile storage media as described herein. In some embodiments, memory 106 may maintain (e.g., store) executable data used by processor 108 to perform one or more operations of hearing device 102 described herein. For example, memory 106 may store instructions 110 that may be executed by processor 108 to perform any of the operations associated with hearing device 102 described herein. Instructions 110 may be implemented by any suitable application, software, code, and/or other executable data instance.

In some embodiments, memory 106 may also maintain any data generated, managed, used, transmitted, and/or received by processor 108. For example, memory 106 may store data representative of an operation program that specifies how processor 108 processes and delivers audio content to a user. To illustrate, if hearing device 102 is implemented by a hearing aid, memory 106 may maintain data representative of an operation program that specifies an audio amplification scheme (e.g., amplification levels, etc.) used by processor 108 to deliver acoustic content to the user. As another example, if hearing device 102 is implemented by a sound processor included in a cochlear implant system, memory 106 may maintain data representative of an operation program that specifies a stimulation scheme used by hearing device 102 to direct a cochlear implant to apply electrical stimulation representative of acoustic content to the user.

Processor 108 may be configured to execute instructions 110 to perform various operations described herein as being performed by hearing device 102.

Charging device 104 may be implemented by any suitable device configured to provide power signal 120 to hearing device 102. For example, charging device 104 may be implemented by a charging case (e.g., a charging case into which hearing device 102 may be physically inserted or otherwise placed to be charged), a charging mat on which hearing device 102 may be placed to be charged, a device to which hearing device 102 may be communicatively coupled via a wired or wireless connection to be charged, and/or any other suitable charging device.

As shown, charging device 104 may include, without limitation, a memory 112 and a processor 114 selectively and communicatively coupled to one another.

In some embodiments, memory 112 may be implemented by any suitable non-transitory computer-readable medium and/or non-transitory processor-readable medium, such as any combination of non-volatile storage media and/or volatile storage media as described herein. In some embodiments, memory 112 may maintain (e.g., store) executable data used by processor 114 to perform one or more operations of charging device 104 described herein. For example, memory 112 may store instructions 116 that may be executed by processor 114 to perform any of the operations associated with charging device 104 described herein. Instructions 116 may be implemented by any suitable application, software, code, and/or other executable data instance. In some embodiments, memory 112 may also maintain any data generated, managed, used, transmitted, and/or received by processor 114.

Processor 114 may be configured to execute instructions 116 to perform various operations described herein as being performed by charging device 104.

Figure 2:
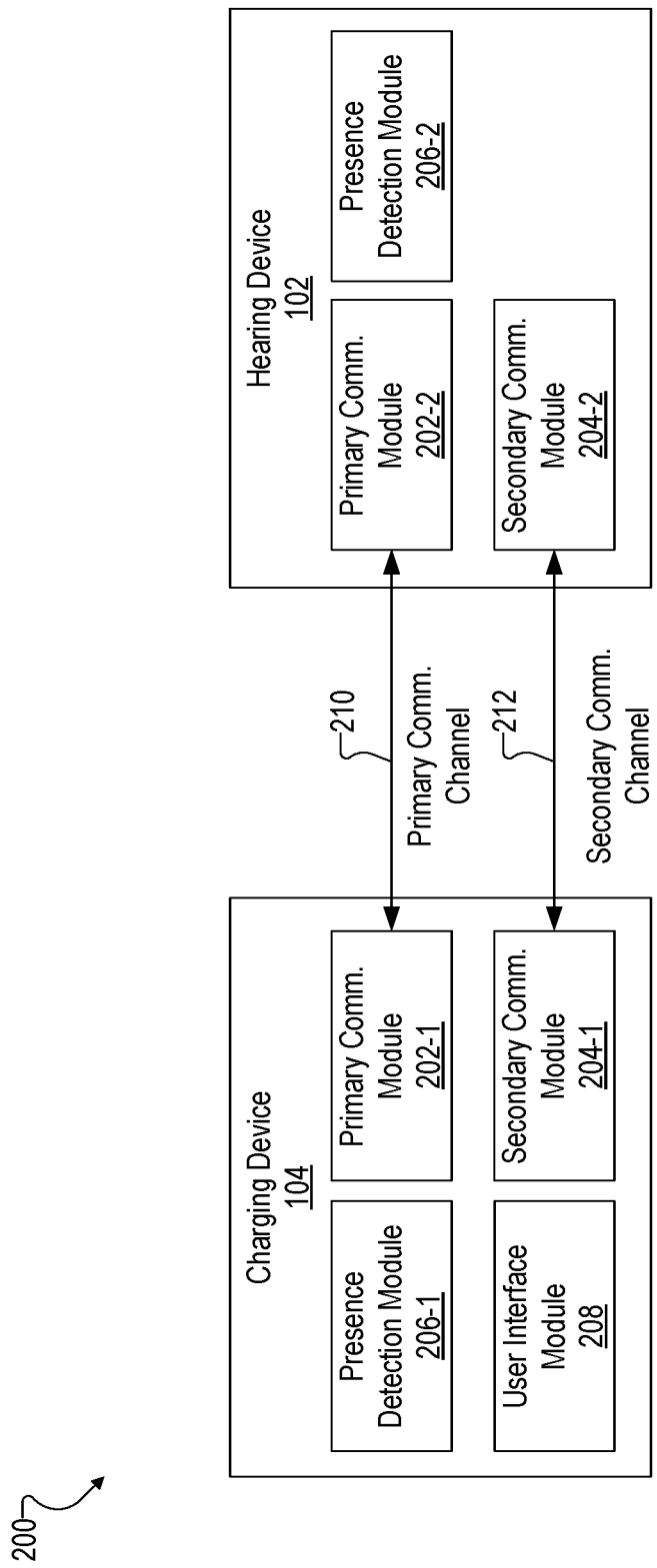
FIG. 2 shows an illustrative implementation of the system of FIG. 1.

FIG. 2 shows an illustrative implementation 200 of system 100. As shown, in implementation 200, charging device 104 includes a primary communication module 202-1, a secondary communication module 204-1, a presence detection module 206-1, and a user interface module 208. Likewise, in implementation 200, hearing device 102 includes a primary communication module 202-2, a secondary communication module 204-2, and a presence detection module 206-2. Each of these modules may include any suitable combination of hardware and/or software as may serve a particular implementation.

Primary communication modules 202-1 and 202-2 (collectively "primary communication modules 202") may be configured to establish and selectively maintain a primary communication channel 210 between hearing device 102 and charging device 104. Likewise, secondary communication modules 204-1 and 204-2 (collectively "secondary communication modules 204") may be configured to establish and selectively maintain a secondary communication channel 212 between hearing device 102 and charging device 104. Various examples of establishing primary communication channel 210 and secondary communication channel 212 are described herein.

As used herein, secondary communication channel 212 refers to a communication channel that allows for communication only over distances that are below a threshold distance (e.g., relatively short distances). In some examples, the threshold distance represents a maximum limit of the charging range of charging device 104.

In some examples, secondary communication channel 212 may be implemented by modulating power signal 120 that is transmitted from charging device 104 to hearing device 102. Power signal 120 may be modulated in any suitable manner. For example, power signal 120 may be modulated by modulating amplitude and/or frequency of power signal 120. As another example, power signal 120 may be modulated by turning power signal 120 on and off in accordance with a desired on-off pattern.

As another example, secondary communication channel 212 may be implemented by transmitting a signal that is different than power signal 120. To illustrate, secondary communication channel 212 may be implemented by transmitting an out-of-band signal (e.g., a near field communication (NFC) signal or any other signal within a frequency range that is outside a frequency range associated with primary communication channel 210).

In some examples, secondary communication channel 212 may be implemented by a communication channel that requires physical connection between conductive contacts of hearing device 102 and charging device 104. For example, such a communication channel may include a wired communication channel and/or a communication channel that is established upon insertion of hearing device 102 into charging device 104.

Additionally or alternatively, secondary communication channel 212 may be implemented by a communication channel with imposed timing constraints on signaling within the communication channel. Such timing constraints may ensure a limited communication range.

In some examples, secondary communication channel 212 may be configured for unidirectional communication between charging device 104 and hearing device 102. For example, secondary communication channel 212 may only allow data to be transmitted from charging device 104 to hearing device 102 (and not from hearing device 102 to charging device 104). In alternative embodiments, secondary communication channel 212 may only allow data to be transmitted from hearing device 102 to charging device 104 (and not from charging device 104 to hearing device 102).

Primary communication channel 210 may be implemented by a communication channel that allows for wireless communication over distances that are greater than the threshold distance associated with the limit of secondary communication channel 212.

For example, primary communication channel 210 may be implemented by a Bluetooth communication channel, such as Bluetooth Low Energy (LE), Bluetooth Basic Rate/Enhanced Data Rate (BR/EDR), etc. As another example, primary communication channel may be implemented by a wireless network communication channel, such as a local area network channel (e.g., WiFi, IEEE 802.11, etc.).

Presence detection module 206-1 and/or presence detection module 206-2 may be configured to detect when hearing device 102 is within a charging range of charging device 104. While a presence detection module is shown as being included in each of charging device 104 and hearing device 102, it will be recognized that in some alternative embodiments, only one of charging device 104 or hearing device 102 may include a presence detection module. For example, in some embodiments, only charging device 104 includes a presence detection module.

Exemplary manners in which charging device 104 (e.g., presence detection module 206-1) and/or hearing device 102 (e.g., presence detection module 206-2) may determine that hearing device 102 is within a charging range of charging device 104 are described herein.

User interface module 208 may be configured to provide user interface functionality for charging device 104. For example, user interface module 208 may be implemented by a graphical user interface, a keyboard, one or more buttons, an audio interface, and/or any other suitable type of interface with which a user may input one or more commands and/or be presented with audio and/or visual content.

In some examples, user interface module 208 may provide an extended user interface that may be used by a user to interact with hearing device 102. For example, hearing device 102 may be relatively small and have limited user interface functionality. Accordingly, user interface module 208 may provide an extended user interface that allows the user to provide input to hearing device 102, access information associated with or provided by hearing device 102, and/or otherwise interact with hearing device 102.

To facilitate extended user interface functionality for hearing device 102 by way of charging device 104, hearing device 102 and charging device 104 may establish primary communication channel 210. Data associated with the user interface functionality may be transmitted between hearing device 102 and charging device 104 by way of primary communication channel 210.

In some scenarios, the data transmitted between hearing device 102 and charging device 104 in connection with the extended user interface functionality provided by user interface module 208 may include data associated with sensitive information stored by hearing device 102, security-relevant functions associated with hearing device 102, and/or other operations that may affect performance and/or safety of hearing device 102. For example, it may be desirable for charging device 104 to be securely used to issue requests toward hearing device 102, perform security-relevant operations (e.g., by initiating a discoverable mode or a pairing mode of hearing device 102), and/or retrieve sensitive information about the internal state of hearing device 102 and/or about the user of hearing device 102.

As such, hearing device 102 and charging device 104 may participate in an authenticated pairing procedure for primary communication channel 210 in which trust is established between hearing device 102 and charging device 104. Upon completion of the authenticated pairing procedure, primary communication channel 210 may be authenticated and thereby used to transmit secure information between hearing device 102 and charging device 104. In some examples, the authenticated pairing procedure may only need to be performed once for hearing device 102 and charging device 104. Thereafter, hearing device 102 and charging device 104 may reestablish the primary communication channel 210 without having to participate in the authenticated pairing procedure.

Various examples of performing an authenticated pairing procedure between hearing device 102 and charging device 104 will now be described in connection with FIGS. 3-6. The operations shown and described in connection with these figures are illustrative of the various manners in which the authenticated pairing procedure between hearing device 102 and charging device 104 may be performed.

Figure 3:
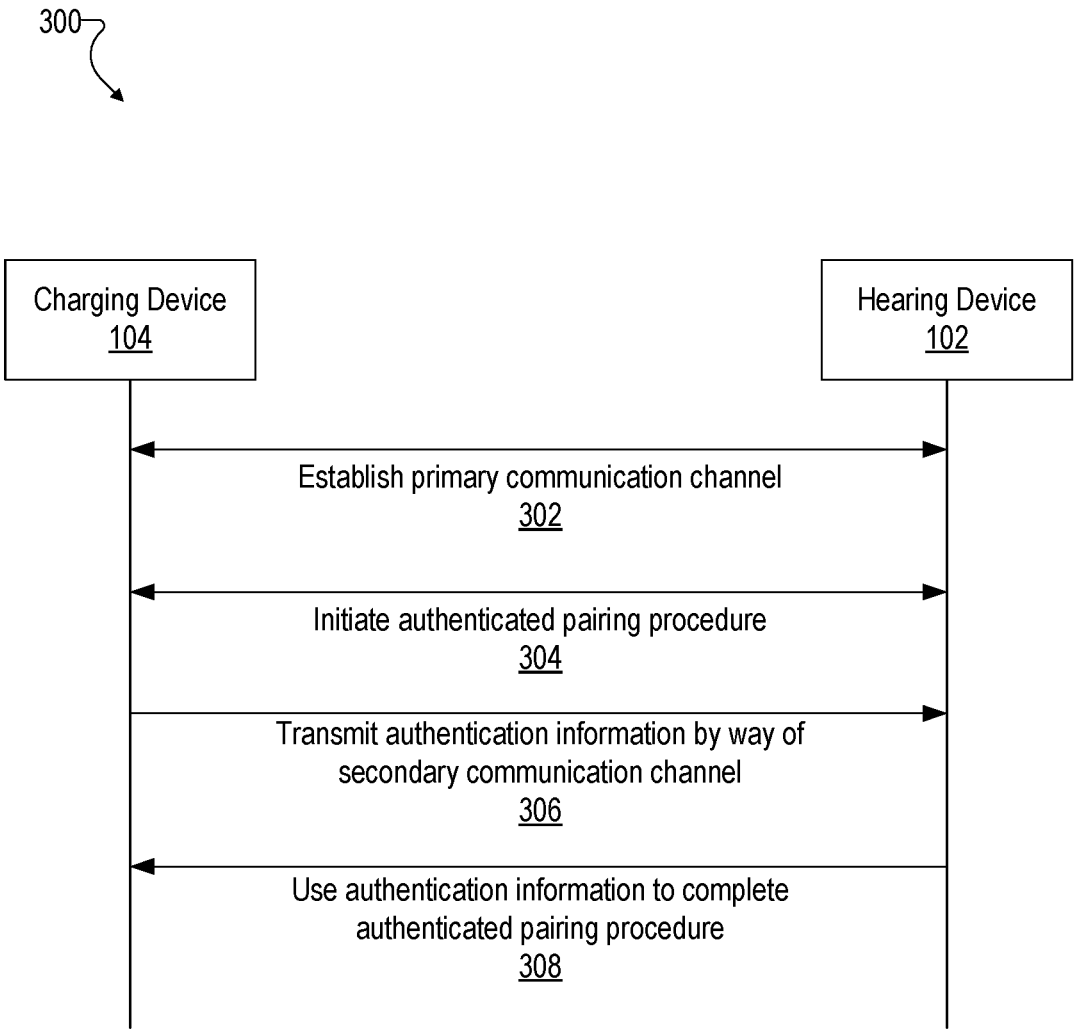
FIGS. 3-6 illustrate various examples of performing an authenticated pairing procedure between a hearing device and a charging device.

FIG. 3 is a flow diagram 300 illustrating an exemplary manner in which an authenticated pairing procedure for a primary communication channel between hearing device 102 and charging device 104 may be performed.

At operation 302, a primary communication channel is established between hearing device 102 and charging device 104. The primary communication channel may be established in any suitable manner. For example, either hearing device 102 or charging device 104 may transmit an invitation to the other device to connect to the primary communication channel.

At operation 304, an authenticated pairing procedure for the primary communication channel is initiated. Hearing device 102 or charging device 104 may initiate the authenticated pairing procedure in any suitable manner.

In some examples, the authenticated pairing procedure may be initiated automatically based on hearing device 102 and charging device 104 being in close enough proximity for a secondary communication channel to be established therebetween.

Alternatively, the authenticated pairing procedure may be initiated based on a determination by hearing device 102 and/or charging device 104 that hearing device 102 is within a charging range of charging device 104. Examples of this are provided herein.

In some examples, initiation of the authenticated pairing procedure may be further based on user input. For example, hearing device 102 and/or charging device 104 may detect user input provided by a user and representative of a request to initiate the authenticated pairing procedure. Such user input may include, for example, a pressing of a button, a closing of a lid of charging device 104, and audio input command, and/or any other suitable type of user input. Based on (e.g., in response to) this user input, hearing device 102 and/or charging device 104 may initiate the authenticated pairing procedure.

At operation 306, charging device 104 transmits, as part of the authenticated pairing procedure, authentication information by way of a secondary communication channel to hearing device 102.

The authentication information may include any type of data that may be used by charging device 104 and hearing device 102 to verify that each device is legitimate. For example, the authentication information may include a pin code, a cryptographic key, device identification information, and/or any other suitable bit sequence (e.g., a signal with at least one bit of information).

To illustrate, in an embodiment using Bluetooth LE or Bluetooth BR/EDR as the primary communication channel, charging device 104 and hearing device 102 may engage in "passkey-entry" pairing, with charging device 104 claiming to be "display-capable" and hearing device 102 claiming to be "keyboard-capable". Instead of actually displaying the passkey to be keyed in by the user into hearing device 102, charging device 104 communicates the passkey to hearing device 102 over the secondary communication channel.

Charging device 104 may transmit the authentication information to hearing device 102 by way of the secondary communication channel in any suitable manner.

For example, in configurations in which charging device 104 provides power to hearing device 102 by transmitting power signal 120 to hearing device 102 by way of the secondary communication channel, charging device 104 may transmit the authentication information to hearing device 102 by modulating power signal 120 as described herein. Hearing device 102 may decode the modulated signal to extract the authentication information.

As another example, charging device 104 may transmit the authentication information to hearing device 102 by transmitting the authentication information in a signal other than power signal 120 (e.g., an out-of-band signal, an electrical signal, a light signal, an acoustical signal, and/or a mechanical vibration signal).

At operation 308, hearing device 102 uses the authentication information to complete the authenticated pairing procedure. For example, hearing device 102 may transmit the authentication information back to charging device 104 as part of the authenticated pairing procedure. Once the authenticated pairing procedure has been completed, a user may interact with a user interface provided by charging device 104 to control, access information, or otherwise interact with hearing device 102 by way of the primary communication channel.

In some examples, hearing device 102 may use the authentication information to complete the authenticated pairing procedure only if hearing device 102 trusts the authentication data transmitted by charging device 104. This trust may be established in response to one or more conditions being satisfied. For example, in some embodiments, hearing device 102 may trust authentication data transmitted by charging device 104 only if at the same time an acoustic channel between a loudspeaker and microphones of hearing device 104 has certain properties characteristic to a hearing device placed into a charging device. As another example, hearing device 102 may trust authentication data transmitted by charging device 104 signal only if an orientation in space of hearing device 102 is a certain way, or if hearing device 102 exhibits a motion pattern representative of a hearing device resting on a charging mat.

Figure 4:
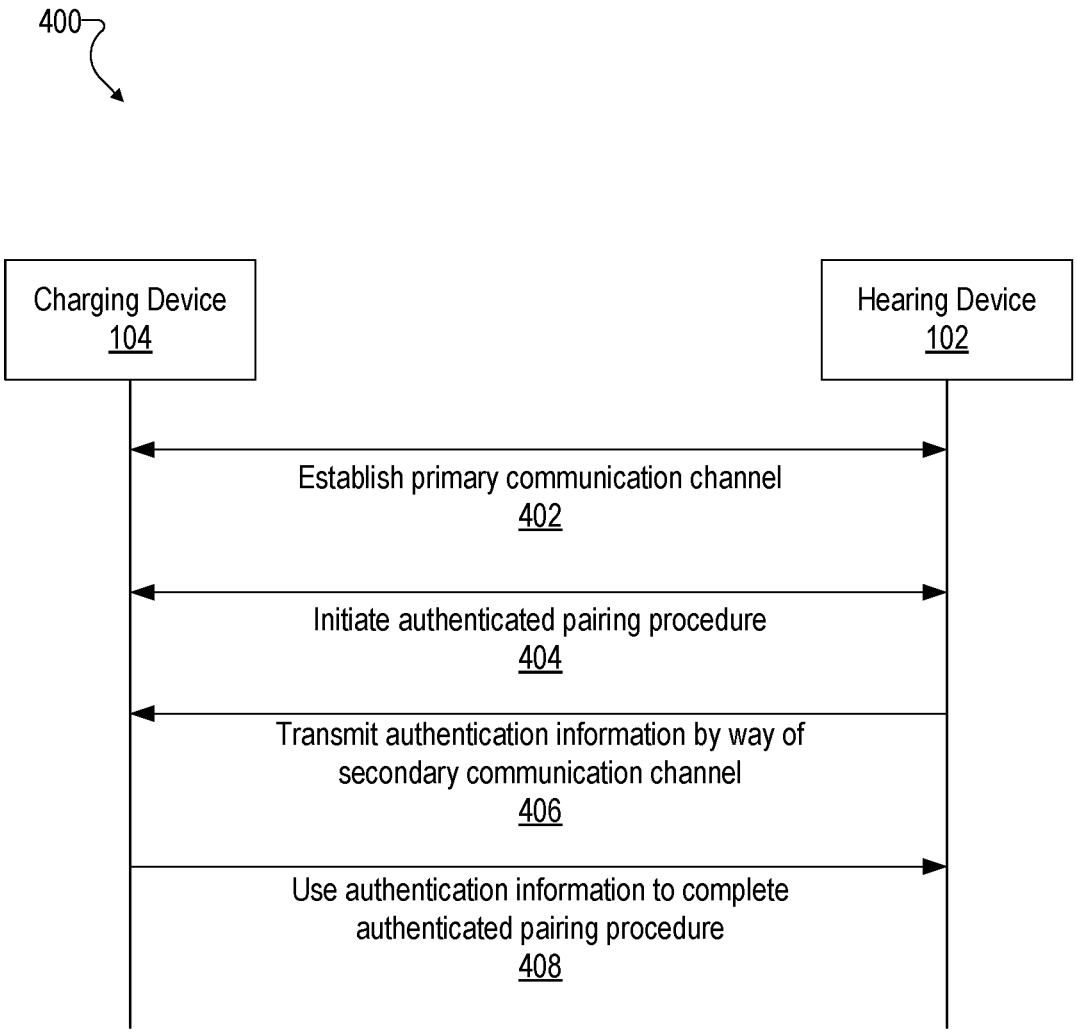

FIG. 4 is a flow diagram 400 illustrating an alternative manner in which an authenticated pairing procedure for a primary communication channel between hearing device 102 and charging device 104 may be performed.

At operation 402, a primary communication channel is established between hearing device 102 and charging device 104. Operation 402 is similar to operation 302 of flow diagram 300 and may be performed in any of the ways described herein.

At operation 404, an authenticated pairing procedure for the primary communication channel is initiated. Operation 404 is similar to operation 304 of flow diagram 300 and may be performed in any of the ways described herein.

At operation 406, hearing device 102 transmits, as part of the authenticated pairing procedure, authentication information by way of a secondary communication channel to charging device 104. This is in contrast to operation 306 of flow diagram 300 in which charging device 104 transmits authentication information by way of the secondary communication channel to hearing device 102. Hearing device 102 may transmit the authentication information to charging device 104 by way of the secondary communication channel in any suitable manner.

At operation 408, charging device 104 uses the authentication information to complete the authenticated pairing procedure. For example, charging device 104 may transmit the authentication information back to hearing device 102 as part of the authenticated pairing procedure.

Figure 5:
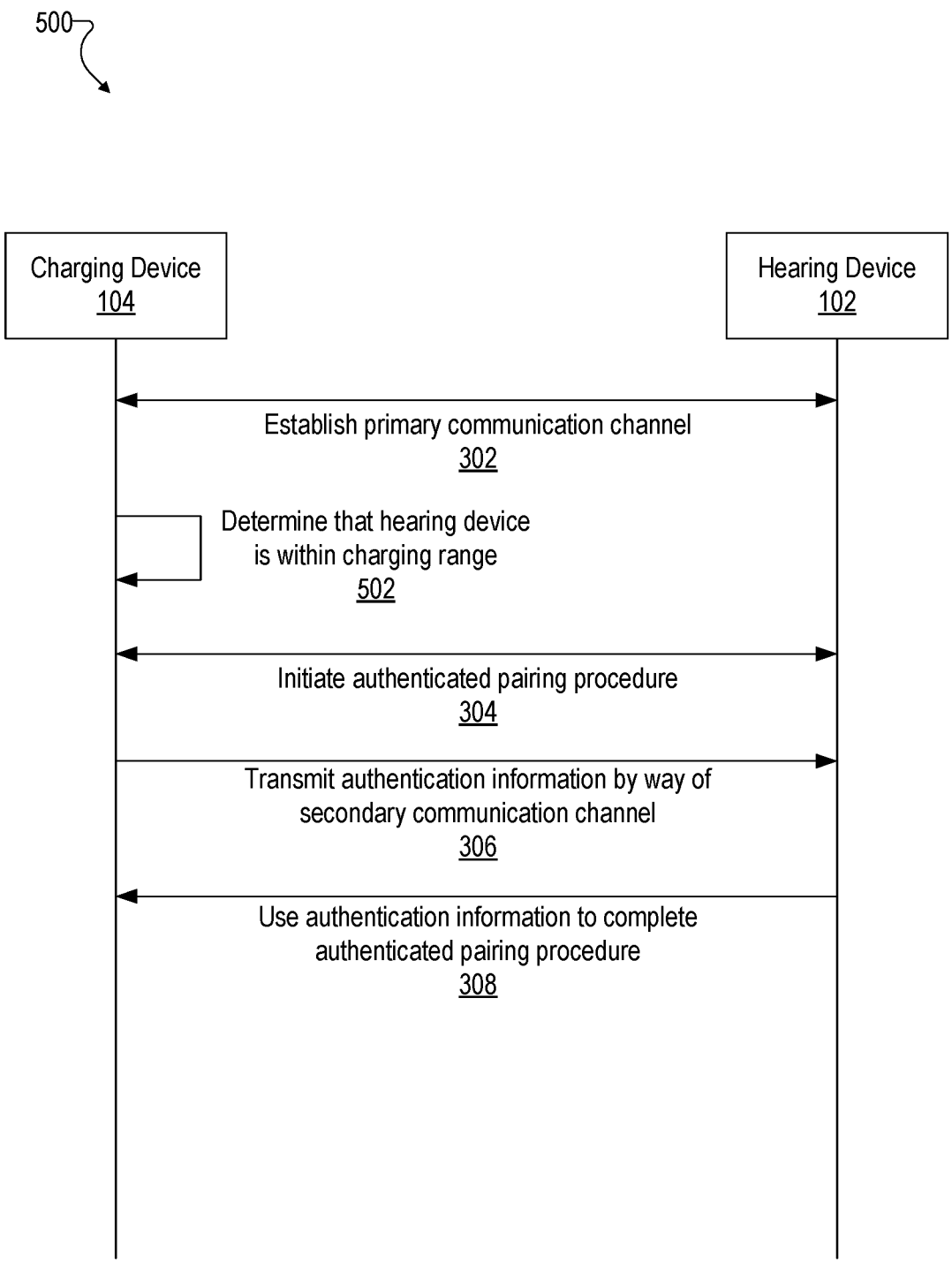

FIG. 5 is a flow diagram 500 illustrating an alternative manner in which an authenticated pairing procedure for a primary communication channel between hearing device 102 and charging device 104 may be performed. Flow diagram 500 is similar to flow diagram 300 in that flow diagram 500 includes operations 302, 304, 306, and 308.

However, as shown, the initiation of the authenticated pairing procedure (operation 304) is based on (e.g., performed in response to) charging device 104 determining that hearing device 102 is within a charging range of charging device 104 (operation 502). In some alternative embodiments, operation 502 may be performed by hearing device 102.

Charging device 104 may determine that hearing device 102 is within the charging range of charging device 104 in any suitable manner. For example, charging device 104 may determine that hearing device 102 is within the charging range of charging device 104 by determining that hearing device 102 is physically coupled to charging device 104. To illustrate, charging device 104 may determine that hearing device 102 is physically coupled to charging device 104 by detecting (e.g., with a sensor, a mechanical switch, and/or other mechanism) that hearing device 102 has been inserted into, placed on, or otherwise placed in physical contact with charging device 104.

Additionally or alternatively, charging device 104 may determine that hearing device 102 is within the charging range of charging device 104 by detecting that hearing device 102 receives, blocks, or changes a signal provided by charging device 104.

To illustrate, charging device 104 may determine that hearing device 102 begins receiving a power signal (e.g., a voltage signal, an inductively received power signal in the context of a wireless charging device), an acoustic signal, and/or any other type of signal. Additionally or alternatively, charging device 104 may determine that hearing device 102 changes a magnetic and/or electric field provided by hearing device 102. Additionally or alternatively, charging device 104 may determine that hearing device 102 blocks a light signal provided by charging device 104. Based on one or more of these determinations, charging device 104 may determine that hearing device 102 is within the charging range of charging device 104.

Figure 6:
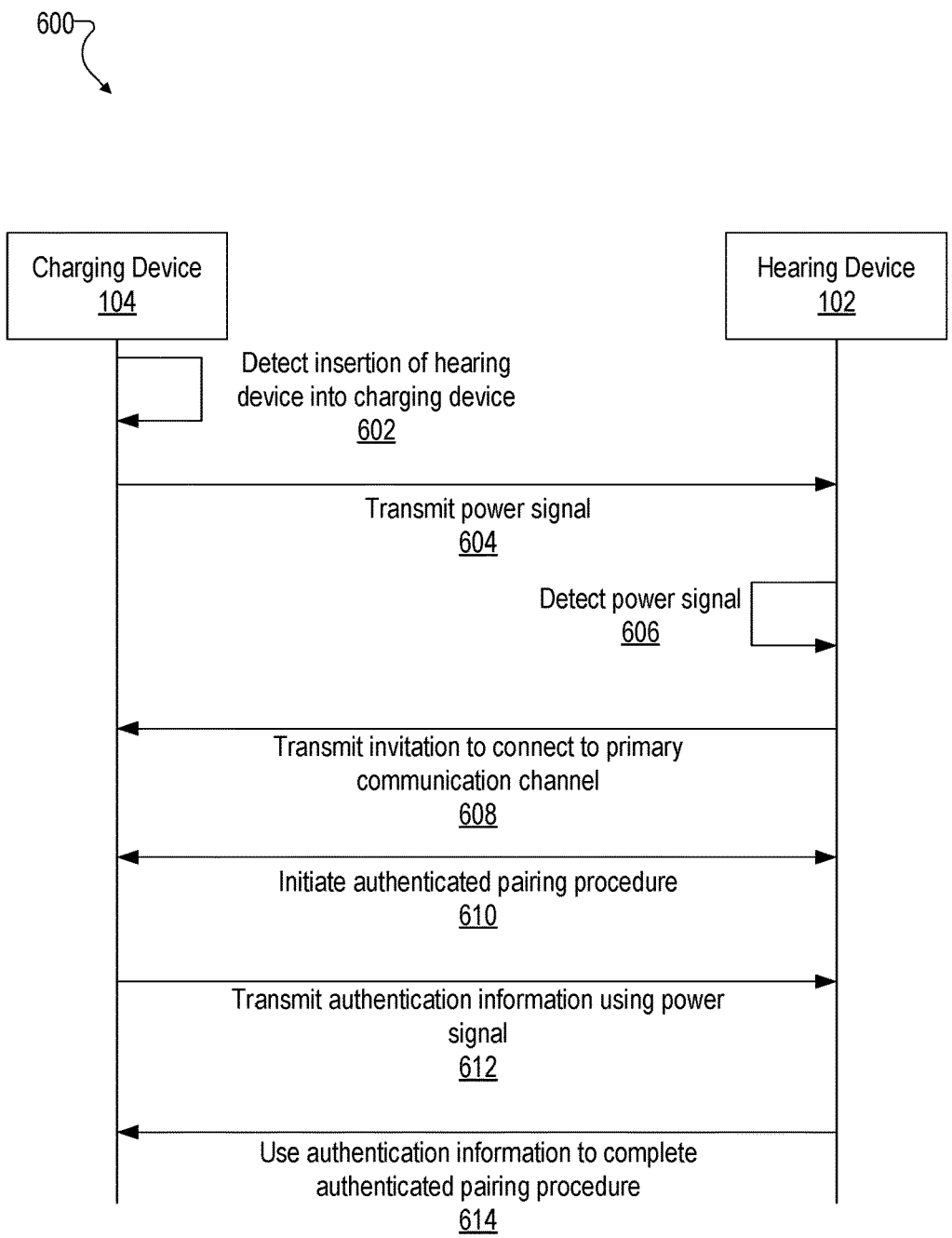

FIG. 6 is a flow diagram 600 illustrating an alternative manner in which an authenticated pairing procedure for a primary communication channel between hearing device 102 and charging device 104 may be performed.

At operation 602, charging device 104 detects an insertion of hearing device 102 into charging device 104. This may be performed in any suitable manner.

At operation 604, charging device 104 transmits a power signal to hearing device 102 upon hearing device 102 being inserted into charging device 104. This may be performed in any suitable manner.

At operation 606, hearing device 102 detects the power signal (i.e., that hearing device 102 is receiving charging power from charging device 104). This may be performed in any suitable manner.

At operation 608, based on the detection of the power signal, hearing device 102 transmits an invitation to charging device 104 for charging device 104 to connect to a primary communication channel. This may be performed in any suitable manner.

At operation 610, charging device 104 and/or hearing device 102 initiate an authenticated pairing procedure for the primary communication channel. This may be performed in any suitable manner.

At operation 612, charging device 104 uses the power signal to transmit authentication information to hearing device 102. For example, as described herein, charging device 104 may modulate the authentication information onto the power signal.

At operation 614, hearing device 102 uses the authentication information to complete the authenticated pairing procedure. This may be performed in any suitable manner.

Figure 7:
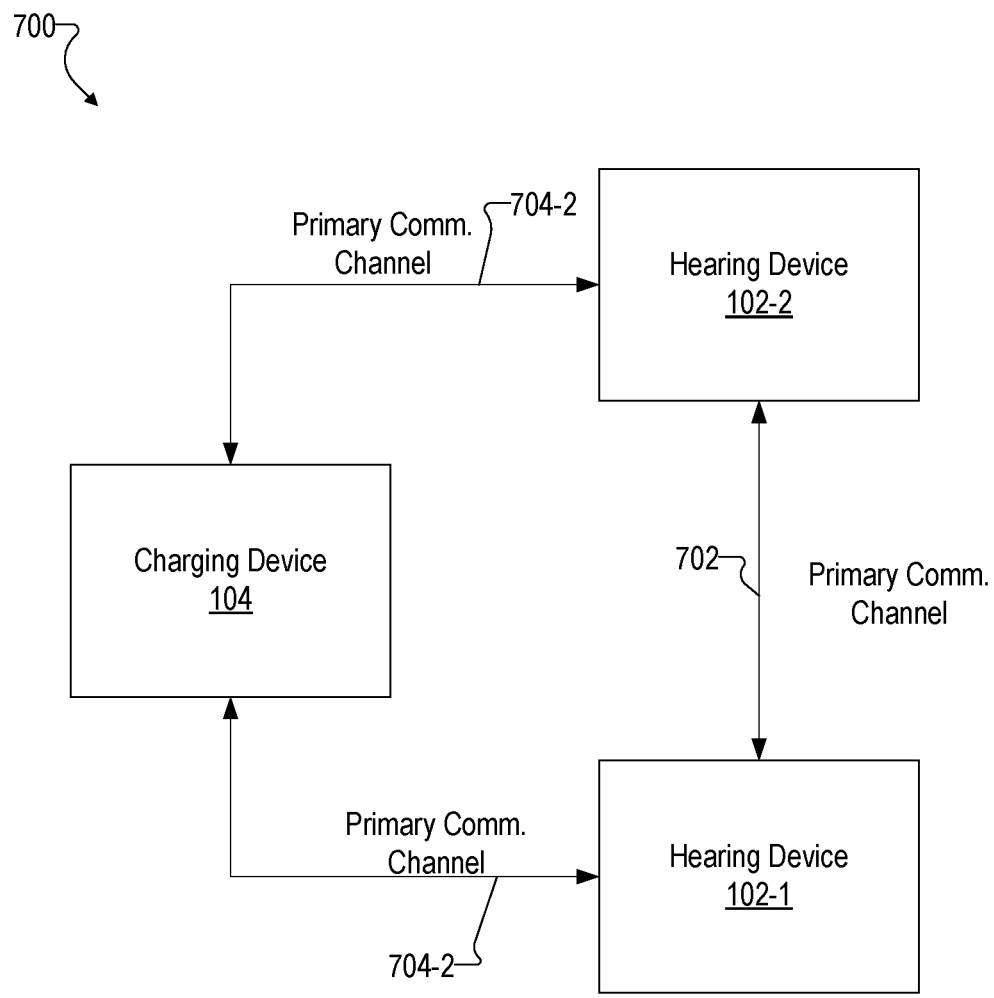
FIG. 7 illustrates an exemplary configuration in which a first hearing device and a second hearing device are configured to perform an authenticated pairing procedure for a primary communication channel between the two hearing devices.

FIG. 7 illustrates an exemplary configuration 700 in which a first hearing device 102-1 and a second hearing device 102-2 are configured to perform an authenticated pairing procedure for a primary communication channel 702 between the two hearing devices 102. As shown, each hearing device 102 may have already established an authenticated primary communication channel (e.g., authenticated primary communication channel 704-1 and authenticated primary communication channel 704-2) with charging device 104 using the techniques described herein. To perform the authenticated pairing procedure for primary communication channel 702, hearing devices 102 may transmit authenticated information to one another by way of authenticated primary communication channels 704 and charging device 104. In this manner, hearing devices 102 may perform the authenticated pairing procedure for primary communication channel 702 without having to establish a secondary communication channel therebetween.

Figure 8:
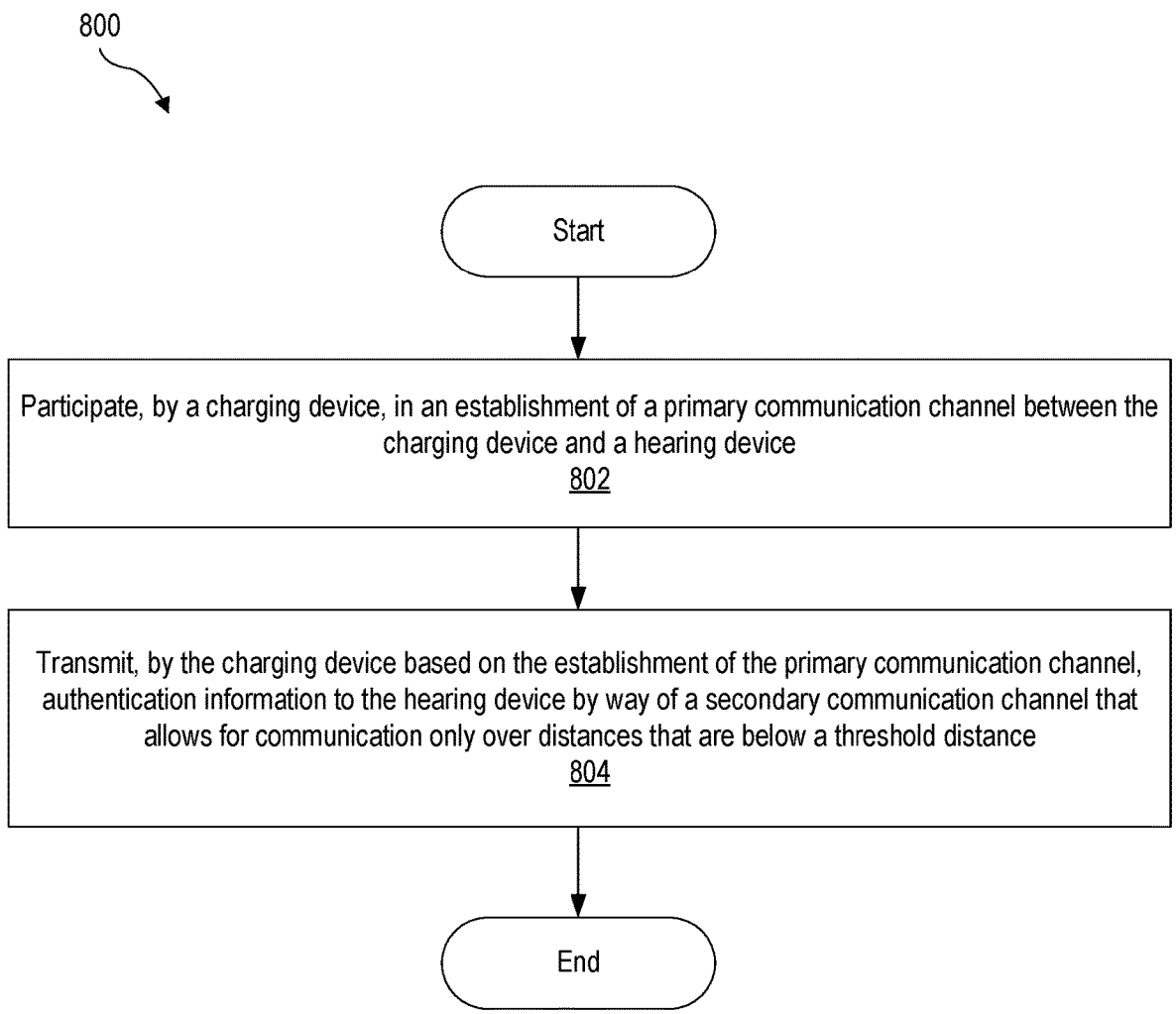
FIG. 8 illustrates an exemplary method.

FIG. 8 illustrates an exemplary method 800 that may be performed by a charging device (e.g., charging device 104). While FIG. 8 illustrates exemplary operations according to one embodiment, other embodiments may omit, add to, reorder, and/or modify one or more operations of the method 800 depicted in FIG. 8. Each operation of the method 800 depicted in FIG. 8 may be performed in any manner described herein.

At operation 802, a charging device participates in an establishment of a primary communication channel between the charging device and a hearing device.

At operation 804, the charging device transmits, based on the establishment of the primary communication channel, authentication information to the hearing device by way of a secondary communication channel that allows for communication only over distances that are below a threshold distance. The authentication information is usable to perform an authenticated pairing procedure for the primary communication channel.

Figure 9:
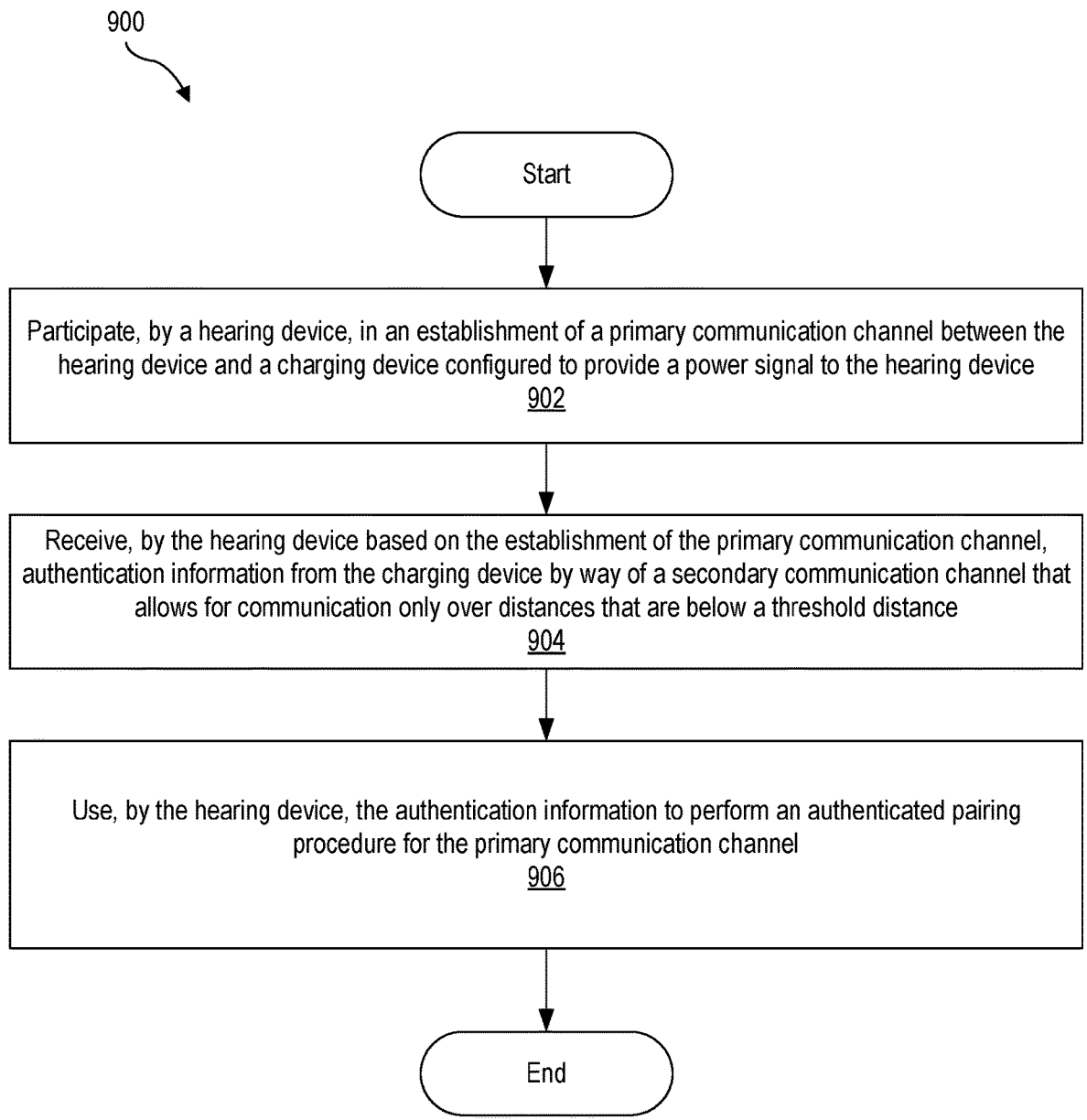
FIG. 9 illustrates an exemplary method.

FIG. 9 illustrates an exemplary method 900 that may be performed by a hearing device (e.g., hearing device 102). While FIG. 9 illustrates exemplary operations according to one embodiment, other embodiments may omit, add to, reorder, and/or modify one or more operations of the method 900 depicted in FIG. 9. Each operation of the method 900 depicted in FIG. 9 may be performed in any manner described herein.

At operation 902, a hearing device participates in an establishment of a primary communication channel between the hearing device and a charging device configured to provide a power signal to the hearing device.

At operation 904, the hearing device receives, based on the establishment of the primary communication channel, authentication information from the charging device by way of a secondary communication channel that allows for communication only over distances that are below a threshold distance.

At operation 906, the hearing device uses the authentication information to perform an authenticated pairing procedure for the primary communication channel.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 10:
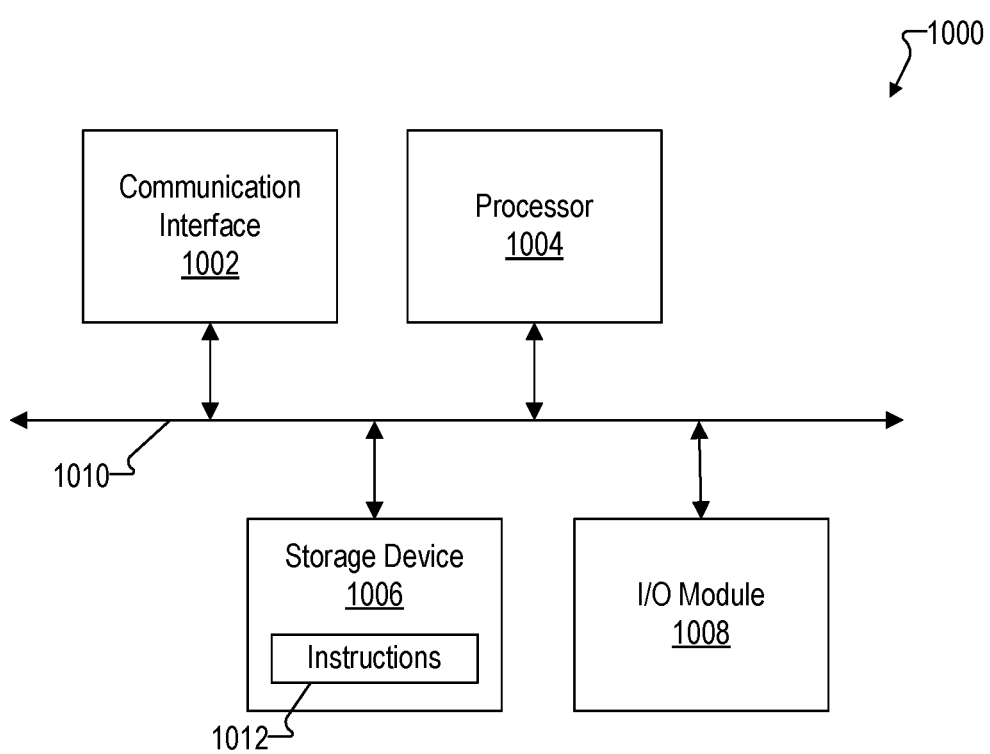
FIG. 10 illustrates an exemplary computing device.

FIG. 10 illustrates an exemplary computing device 1000 that may be specifically configured to perform one or more of the processes described herein. To that end, any of the systems and/or devices described herein may be implemented by computing device 1000.

As shown in FIG. 10, computing device 1000 may include a communication interface 1002, a processor 1004, a storage device 1006, and an input/output ("I/O") module 1008 communicatively connected one to another via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data and/or interpreting, executing, and/or directing execution of one or more of the instructions, processes, and/or operations described herein. Processor 1004 may perform operations by executing computer-executable instructions 1012 (e.g., an application, software, code, and/or other executable data instance) stored in storage device 1006.

Storage device 1006 may include one or more data storage media, devices, or configurations and may employ any type, form, and combination of data storage media and/or device. For example, storage device 1006 may include, but is not limited to, any combination of the non-volatile media and/or volatile media described herein. Electronic data, including data described herein, may be temporarily and/or permanently stored in storage device 1006. For example, data representative of computer-executable instructions 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
    a hearing device; and
    a charging device configured to provide a power signal to the hearing device while the hearing device is within a charging range of the charging device;
    wherein the hearing device and the charging device are configured to:
        establish a primary communication channel between the hearing device and the charging device, and
        participate in an authenticated pairing procedure for the primary communication channel by:
            the charging device transmitting authentication information to the hearing device by way of a secondary communication channel that allows for communication only over distances that are below a threshold distance, and
            the hearing device using the authentication information to complete the authenticated pairing procedure;
    wherein the charging device is configured to transmit the authentication information to the hearing device by way of the secondary communication channel by modulating the power signal.

2. The system of claim 1, wherein at least one of the charging device or the hearing device is further configured to:
    determine that the hearing device is within the charging range of the charging device; and
    initiate, based on the determining that the hearing device is within the charging range of the charging device, the authenticated pairing procedure.

3. The system of claim 2, wherein the determining that the hearing device is within the charging range of the charging device comprises determining that the hearing device is physically coupled to the charging device.

4. The system of claim 2, wherein the determining that the hearing device is within the charging range of the charging device comprises detecting that the hearing device receives, blocks, or changes a signal provided by the charging device.

5. The system of claim 4, wherein the signal comprises at least one of a voltage signal, a wireless power signal, a magnetic field, an electric field, a light signal, or an acoustical signal.

6. The system of claim 2, wherein the initiating of the authenticated pairing procedure is performed automatically based on the determining that the hearing device is within the charging range of the charging device.

7. The system of claim 2, wherein at least one of the charging device or the hearing device is further configured to:
    detect user input provided by a user and representative of a request to initiate the authenticated pairing procedure;
    wherein the initiating of the authenticated pairing procedure is further based on the user input.

8. The system of claim 1, wherein the power signal comprises at least one of a voltage signal, a magnetic field, or an electric field.

9. The system of claim 1, wherein the charging device is further configured to transmit the authentication information to the hearing device by way of the secondary communication channel by transmitting the authentication information in one or more of an electrical signal, a light signal, an acoustical signal, or a mechanical vibration signal.

10. The system of claim 1, wherein the authentication information comprises at least one of a pin code, a cryptographic key, or a bit sequence.

11. The system of claim 1, wherein the threshold distance comprises a distance representing a maximum limit of the charging range.

12. The system of claim 1, wherein the secondary communication channel is configured for unidirectional communication between the charging device and the hearing device.

13. The system of claim 1, wherein the primary communication channel comprises one or more of a Bluetooth wireless communication channel or a wireless network communication channel.

14. The system of claim 1, further comprising:
    a second hearing device configured to participate in a second authenticated pairing procedure with the charging device for a second primary communication channel between the second hearing device and the charging device;
    wherein the hearing device and the second hearing device are further configured to:
        establish a third primary communication channel between the hearing device and the second hearing device, and
        transmit authentication information associated with an authenticated pairing procedure for the third primary communication channel to one another by way of the first and second primary communication channels and the charging device.

15. A charging device comprising:
a memory storing instructions; and
a processor communicatively coupled to the memory and configured to execute the instructions to:
- provide a power signal to a hearing device while the hearing device is within a charging range of the charging device;
- participate in an establishment of a primary communication channel between the charging device and the hearing device, and
- transmit, based on the establishment of the primary communication channel, authentication information to the hearing device by way of a secondary communication channel that allows for communication only over distances that are below a threshold distance, the authentication information usable to perform an authenticated pairing procedure for the primary communication channel;

wherein the processor is configured to transmit the authentication information to the hearing device by way of the secondary communication channel by modulating the power signal.

16. The charging device of claim 15, wherein the charging device is further configured to:
- determine that the hearing device is within the charging range of the charging device; and
- initiate, based on the determining that the hearing device is within the charging range of the charging device, the authenticated pairing procedure.

* * * * *